Sept. 25, 1928.  
E. J. ARMSTRONG  
1,685,306  
STEERING APPARATUS FOR MOTOR DRIVEN VEHICLES  
Filed Aug. 29, 1921  
2 Sheets-Sheet 1
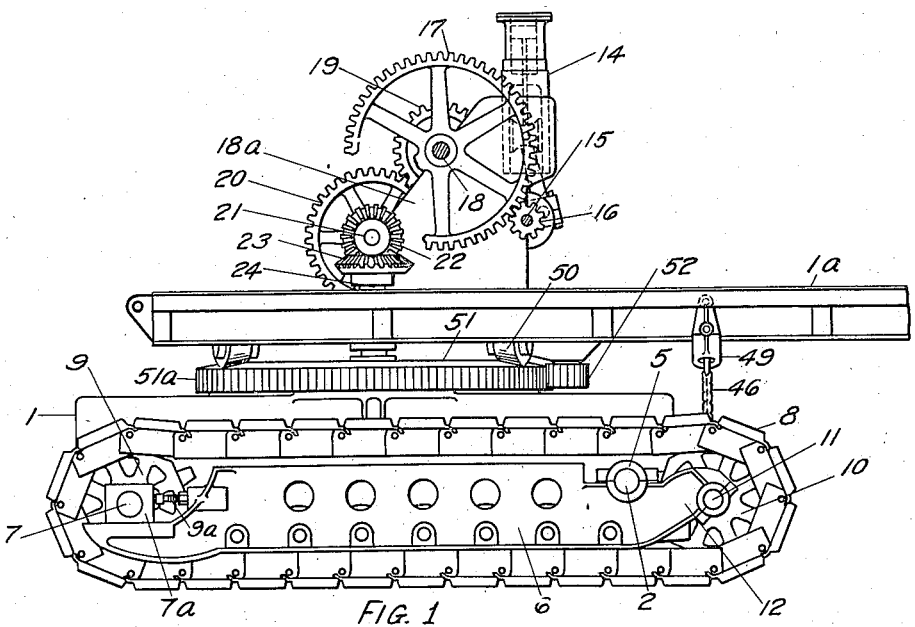
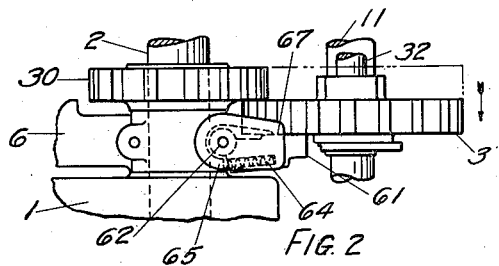
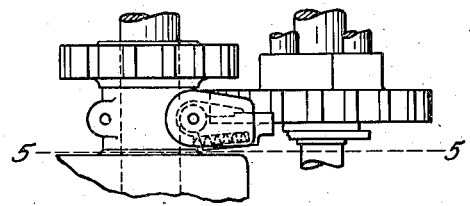
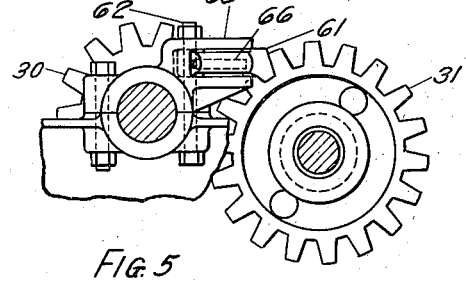
Edwin J. Armstrong
Inventor
By
Attorney

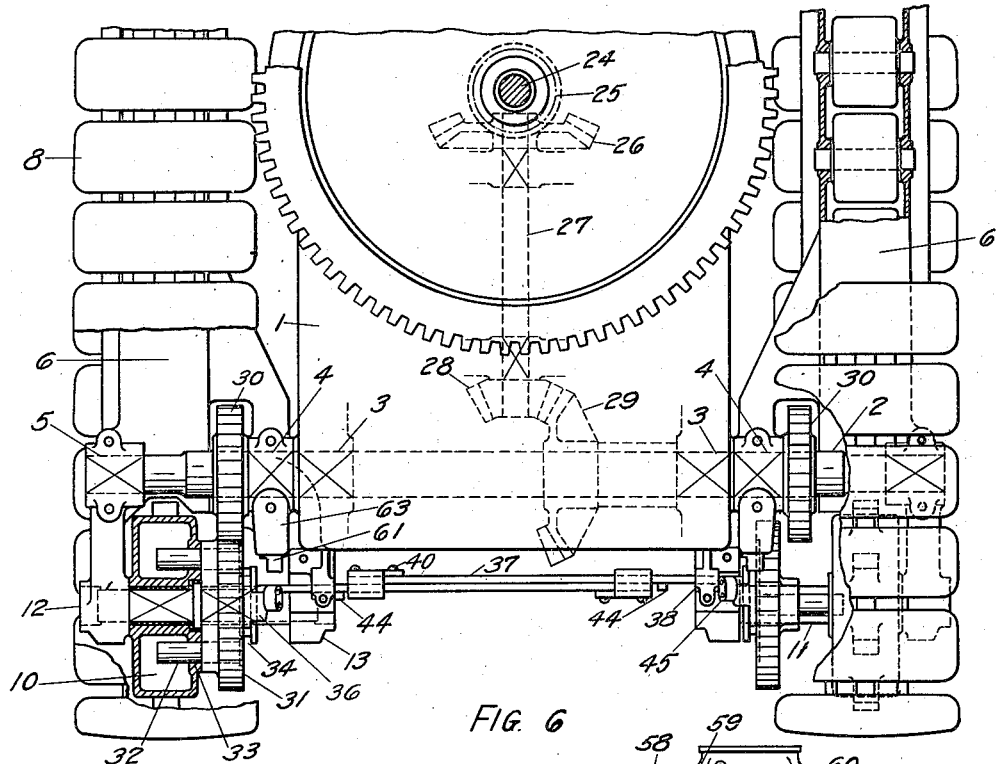

Patented Sept. 25, 1928.

1,685,306

UNITED STATES PATENT OFFICE.

EDWIN J. ARMSTRONG, OF ERIE, PENNSYLVANIA, ASSIGNOR, BY MESNE ASSIGNMENTS, TO BUCYRUS-ERIE COMPANY, OF SOUTH MILWAUKEE, WISCONSIN, A CORPORATION OF DELAWARE.

STEERING APPARATUS FOR MOTOR-DRIVEN VEHICLES.

Application filed August 29, 1921. Serial No. 496,469.

With bulky apparatuses, such as steam shovels, portable cranes and the like it is desirable to provide simple yet rugged steering apparatus. The problem is somewhat complicated when such devices are provided with traveling tracks. The present invention is directed to a steering apparatus designed for such apparatus and in its preferred form is so arranged that it may be actuated by a turn-table or similar device forming a part of the apparatus.

The construction exemplifying the invention is particularly designed for a steam shovel and is shown in the accompanying drawings as follows:—

Fig. 1 shows a side elevation of the apparatus.

Figs. 2, 3 and 4 plan views of the locking device for locking one side of the apparatus to effect the steering action.

Fig. 5 a side elevation of the same apparatus.

Fig. 6 a plan view, partly in section, of the apparatus, the platform being removed.
Fig. 7 an end view of the apparatus, parts being broken away to better show construction.

1 marks the frame, 2 the driving axle mounted in bearings 3 in the frame, and 4 and 5 bearings on the axle carrying the track frame 6. The front axle 7 extends through bearings 7ª in the track frame, this bearing being slidingly mounted in an adjusting device 9ª. A sprocket 9 is journaled on the axle 7 and the track or chain 8 runs over the sprocket 9 and is driven from a sprocket 10. The sprocket 10 is mounted on a shaft 11 and the shaft 11 is mounted in bearings 12 and 13 on the track frame 6. The apparatus is driven from one of the engines 14 of the shovel. A pinion 16 is fixed on a crank shaft 15 of the engine 14 and meshes with a gear 17. The apparatus is driven from the engine 14 mounted on a turn table 1ª. The gear 17 is fixed on a shaft 18 journaled in a post 18ª extending upwardly from the table 1ª. A gear 19 is also fixed on the shaft 18 and meshes with a gear 20. The gear 20 is fixed on a shaft 21. A bevelled gear 22 is fixed on the shaft 21 and drives a gear 23. The gear 23 is fixed on a vertical shaft 24 extending through the table. A bevelled gear 25 is fixed on the lower end of the shaft 24 (see dotted lines Fig. 6) and meshes with a gear 26. The gear 26 is fixed on a shaft 27 journaled in the frame 1. The gear 28 is fixed on the rear end of the shaft 27 and meshes with a gear 29 on the driving axle 2. Gears 30 are fixed on the driving axle outside of the bearings 4. Gears 31 mesh with the gears 30. The gears 31 are slidingly mounted on the shafts 11. Pins 32 extend from the gears 31 through openings 33 in the sprockets 10, thus locking the gears 31 rotatively with the sprockets. The gears are provided with grooved hubs 34 into which lips 35 of shifting blocks 36 extend. The blocks 36 are mounted on sliding bolts or bars 37. These bars are slidingly mounted in guides 38 on the track frames. Each bar has a strap 39 secured to it by rivets 40, the strap extending around the companion bar, the two straps tending to guide the bars. A spring 41 is secured by means of eye-bolts 42 with projections 43 on the straps 39 and tend to push the bars or bolts 37 outwardly so as to maintain the gears 31 in mesh with the gears 30. Stops 44 are arranged on the bars which stops engage the guides 38 when the gears 31 are in meshing position with the gears 30. Projections 45 extend upwardly from the shifting blocks 36 and chains 46 are connected with these projections by U-bolts 47. The opposite ends of the chains are provided with hooks 48 which are adapted to be dropped into loops 49 carried by the turn table.

It will readily be seen that as the turn table is thrown in one direction or the other it pulls one or the other of the chains and as it does pull on a chain it pulls the block 36 with which it is connected and this movement of the block carries with it the gear 31 so as to throw the gear out of mesh with the driving gear 30. Ordinarily these driving wheels are at the rear of the shovel so that by swinging the front end of the platform in the direction that it is desired to go the proper gear is thrown out of mesh to effect a steering movement in the direction to which the table is turned. As soon as the table is brought to neutral or relieved of strain the spring 41 immediately snaps the gear 31 back into mesh with the gear 30 and the apparatus is then in straight driving position. It will be noted that during this movement the gear 31 is retained in mesh with the sprocket and it will also be noted that breaking the connection by means of a gear assures a re-engagement or locking of the driving mechanism with a very slight movement of this mechanism. This is of advantage because when the shovel has been brought to the direction which it is desired to go there is very slight added movement of a steering end prior to the re-engagement of both driving mechanisms so as to effect a straight-ahead movement.

The turn table is operated with any of the usual mechanisms. As shown the table is mounted on the rollers 50 operating on the circular track 51. A gear 51ª surrounds the track 51, the gear 51 being locked with the frame. A gear 52 meshes with the gear 51ª. The gear 52 is fixed on a shaft 53 extending upwardly and journaled in bearings 53ª. A gear 54 is fixed on the shaft 53 and meshes with a pinion 55. The pinion 55 is fixed on a shaft 56 extending through the upper part of the table and journaled in bearings carried by the table. A bevelled gear 57 is fixed on the shaft 56 and meshes with a bevelled pinion 58. The bevelled pinion 58 is fixed on a crank shaft 59 of an engine 60 mounted on the table. It will readily be seen that through this connection the table may be swung as desired through the action of the engine in the usual manner.

In order to increase the steering effect it is desirable to not only disengage one side of the driving apparatus but to lock the driving mechanism at that side so that the turning movement will be more pronounced. This is effected in this apparatus by the following mechanism:—A pawl 61 is pivotally mounted on a pin 62 on the track frame 6. Guide plates 63 extend each side of the pawl 61. A spring 64 operates against a shoulder 65 and extends into an opening 66 in the pawl and yieldingly holds the pawl against a stop 67 on the plates 63. This pawl is in the path of the gear 31 as it is moved after it is drawn out of mesh with the gear 30. The pawl is so positioned that the gear 31 is moved a sufficient distance to break the connection with the gear 30 before it can be engaged by the pawl 61. If the gear 31 presents a space between the gear teeth into which the pawl can move the pawl stays stationary and immediately locks the gear 31 as it is moved to the position breaking its connection with the gear 30. If the teeth are not in the right position to engage the pawl, the pawl yields as clearly shown in Fig. 3 until the gear 31 reaches a position at which the pawl will snap into place. The pins 32 are of sufficient length to maintain the connection between the gear 31 and the sprocket 10 when the pawl 61 is in locking position on the gear 31. Consequently the driving mechanism at that side of the apparatus is not only out of driving relation but the mechanism is locked against movement so that as the opposite side is driven forward the shovel turns as on a pivot. As the strain of the table on the chain is released the spring 41 throws the gear 31 out of engagement with the pawl 61 and then into mesh with the gear 30 so that the apparatus then will move forward with a uniform driving action on both sides.

What I claim as new is:—

1. In an apparatus of the class described, the combination of a frame; a turn table on the frame; driving wheels for the apparatus at each side of the frame; driving mechanism for the wheels; and means controlled by the movement of the turn table compelling the driving mechanism to vary the relative driving action on the wheels to steer the apparatus.

2. In an apparatus of the class described, the combination of a frame; a turn table on the frame; driving wheels for the apparatus at each side of the frame; driving mechanism for the wheels; and means controlled by the movement of the turn table releasing the driving connection at one side of the mechanism to steer the apparatus.

3. In an apparatus of the class described, the combination of a frame; a turn table on the frame; driving wheels for the apparatus at each side of the frame; driving mechanism for the wheels; means controlled by the movement of the turn table releasing the driving connection at one side of the mechanism to steer the apparatus; and means for locking the wheels released.

4. In an apparatus of the class described, the combination of a frame; a turn table on the frame; driving wheels for the apparatus at each side of the frame; driving mechanism for the wheels; and means controlled by the movement of the turn table for releasing the driving connection at one side of the apparatus and locking the wheels so released.

5. In an apparatus of the class described, the combination of a frame; a turn table on the frame; driving wheels for the apparatus at each side of the frame; a traveling track driven by the driving wheels; driving mechanism for the wheels; and means controlled by the movement of the table controlling the driving mechanism to vary the relative driving action on the wheels to steer the apparatus.

6. In an apparatus of the class described, the combination of a frame; a turn table on the frame; driving wheels for the apparatus at each side of the frame; a traveling track driven by the driving wheels; driving mechanism for the wheels; and means controlled by the movement of the turn table for releasing the driving mechanisms at one side of the apparatus to steer the apparatus.

7. In an apparatus of the class described, the combination of a frame; a turn table on the frame; driving wheels for the apparatus at each side of the frame; a traveling track driven by the driving wheels; driving mechanism for the wheels; means controlled by the movement of the turn table for releasing the driving mechanisms at one side of the apparatus to steer the apparatus; and means for locking the side released.

8. In an apparatus of the class described, the combination of a frame; a turn table on the frame; driving wheels for the apparatus at each side of the frame; a traveling track driven by the driving wheels; driving mechanism for the wheels; and means controlled by the movement of the turn table releasing the driving connection at one side and locking the same for steering the apparatus.

9. In an apparatus of the class described, the combination of a frame; a turn table on the frame; driving wheels for the apparatus at each side of the frame; a drive shaft; a driving gear for each driving wheel on said shaft; a driven gear connected with each driving wheel and meshing with one of the driving gears; and means controlled by the movement of the turn table for throwing one of said sets of gears out of mesh.

10. In an apparatus of the class described, the combination of a frame; a turn table on the frame; driving wheels for the apparatus at each side of the frame; a drive shaft; a driving gear for each driving wheel on said shaft; a driven gear connected with each driving wheel and meshing with one of the driving gears; and means controlled by the movement of the turn table for moving a driven gear out of mesh with a driving gear.

11. In an apparatus of the class described, the combination of a frame; a turn table on the frame; driving wheels for the apparatus at each side of the frame; a drive shaft; a driving gear for each driving wheel on said shaft; a driven gear connected with each driving wheel and meshing with one of the driving gears; means controlled by the movement of the turn table for throwing one of said sets of gears out of mesh; and a lock for the driven gear as the gears are thrown out of mesh.

12. In an apparatus of the class described, the combination of a frame; a turn table on the frame; driving wheels for the apparatus at each side of the frame; a drive shaft; a driving gear for each driving wheel on said shaft; a driven gear connected with each driving wheel and meshing with one of the driving gears; means controlled by the movement of the turn table for moving a driven gear out of mesh with a driving gear, and means for locking a driven gear as it is moved out of mesh with a driving gear, said driven gear retaining its connection with the driving wheel as it is moved out of mesh with the driving gear.

13. In an apparatus of the class described, the combination of a frame; a turn table on the frame; driving wheels for the apparatus at each side of the frame; a drive shaft; a driving gear for each driving wheel on said shaft; a driven gear connected with each driving wheel and meshing with one of the driving gears; means controlled by the movement of the turn table for moving a driven gear out of mesh with a driving gear; and a pawl in the path of the driven gear into engagement with which the driven gear is moved after it is moved out of mesh with a driving gear.

14. In an apparatus of the class described, the combination of a frame; driving wheels for the apparatus at each side of the frame; a driving shaft; a driving gear on said shaft for each driving wheel; a driven gear connected with each driving wheel and meshing with one of the driving gears; means for throwing a driven gear out of mesh with a driving gear while retaining its connection with its driving wheel; and means directly engaging the driven gear teeth to lock the same as the driven gear is moved out of mesh with its driving gear to lock the driving wheel.

15. In an apparatus of the class described, the combination of a frame; driving wheels for the apparatus at each side of the frame; a traveling track driven by a driving wheel; a driving shaft; a driving gear on said shaft for each driving wheel; a driven gear connected with each driving wheel and meshing with one of the driving gears; means for throwing a driven gear out of mesh with a driving gear while retaining its connection with its driving wheel; and means for locking the driven gear teeth as the driven gear is moved out of mesh with its driving gear to lock the driving wheel.

16. In an apparatus of the class described, the combination of a frame; a turn table on the frame; driving wheels for the apparatus at each side of the frame; a traveling track driven by a driving wheel; a drive shaft; a driving gear for each driving wheel on said shaft; a driven gear connected with each driving wheel and meshing with one of the driving gears; means for moving a driven gear out of mesh with a driving gear; and a pawl in the path of the teeth of the driven gear into engagement with which the teeth of the driven gear are moved after they are moved out of mesh with a driving gear.

17. In an apparatus of the class described, the combination of a frame; driving wheels for the apparatus at each side of the frame; a shaft; driving gears, one for each driving wheel on said shaft; driven gears connected with said driving wheels and meshing with said driving gears; sliding bolts connected with said driven gears; springs operating on said bolts and tending to retain said gears in mesh; and means for moving a gear out of mesh against the pressure of said spring.

18. In an apparatus of the class described, the combination of a frame; driving wheels for the apparatus at each side of the frame; a shaft; driving gears, one for each driving wheel on said shaft; driven gears connected with said driving wheels and meshing with said driving gears; sliding bolts connected with said driven gears; springs operating on said bolts and tending to retain said gears in mesh; and means for moving a gear out of mesh against the pressure of said spring comprising a turntable on the frame.

19. In an apparatus of the class described, the combination of a frame; an axle mounted in the frame; a traveling frame carried by the axle; driving gears on the axle; sprocket wheels journaled in said traveling frame; driven gears meshing with said driving gears and connected with said sprockets; and means for breaking the connection between the axle and one of the sprockets comprising a turn table carried by the frame.

20. In an apparatus of the class described, the combination of a frame; an axle mounted in the frame; a traveling frame carried by the axle; driving gears on the axle; sprocket wheels journaled in said traveling frame; driven gears meshing with said driving gears and connected with said sprockets; means for breaking the connection between the axle and one of the sprockets comprising a turn table carried by the frame; and devices for locking the sprocket with which the connection is broken.

21. In an apparatus of the class described, the combination of a frame; an axle mounted in the frame; a traveling frame carried by the axle; driving gears on the axle; sprocket wheels journaled in said traveling frame; driven gears meshing with said driving gears and connected with said sprockets; and means for moving a driven gear out of mesh with a driving gear to break the driving connection between the axle and the sprocket comprising a turn table mounted on the frame.

22. In an apparatus of the class described, the combination of a frame; an axle mounted in the frame; a traveling frame carried by the axle; driving gears on the axle; sprocket wheels journaled in said traveling frame; driven gears meshing with said driving gears and connected with said sprockets; means for moving a driven gear out of mesh with a driving gear to break the driving connection between the axle and the sprocket while maintaining the connection between a driven gear and the sprocket; and a pawl engaging the teeth of a driven gear as it is moved out of mesh with a driving gear for locking said driven gear.

23. In an apparatus of the class described, the combination of a frame; a driving wheel at each side of the frame; a driven gear connected with said driving wheels, said connection comprising means permitting an axial movement of said driven gears; driving gears for said driven gears; and means comprising a turn table mounted on the frame for moving said driven gears out of mesh with said driving gears.

24. In an apparatus of the class described, the combination of a frame; a driving wheel at each side of the frame; a driven gear connected with said driving wheels, said connection comprising means permitting an axial movement of said driven gears; driving gears for said driven gears; and means comprising sliding bolts connected with said driven gears for moving said driven gears out of mesh with said driving gears.

25. In an apparatus of the class described, the combination of a frame; a driving wheel at each side of the frame; a driven gear connected with said driving wheels, said connection comprising means permitting an axial movement of said driven gears; driving gears for said driven gears; means comprising sliding bolts connected with said driven gears for moving said driven gears out of mesh with said driving gears; and a spring acting on said bolts tending to hold said gears in mesh.

26. The combination with a base, a platform revolubly mounted on said base, crawling traction devices arranged at the sides of said base, and means for connecting said traction devices with driving mechanism, of means controlled by the movement of said platform to disconnect one of said traction devices from said driving mechanism.

27. In an apparatus of the class described, the combination of a frame; a turn table on the frame; driving wheels for the apparatus at each side of the frame; traveling tracks driven by the driving wheels; power means mounted on the table; swinging devices for the table actuated by said power means; driving mechanism for the wheels; and steering devices actuated by power from said means transmitted through said swinging devices controlling the driving mechanism to vary the relative driving action of the wheels to steer the apparatus.

28. In an apparatus of the class described, the combination of a frame; a turn table on the frame; driving wheels for the apparatus at each side of the frame; driving tracks driven by the driving wheels; power means mounted on the table; swinging devices for the table comprising a pinion depending from the turn table and actuated by said power means; driving mechanism for the wheels; and steering devices actuated by power from said means transmitted through said pinion controlling the driving mechanism to vary the relative driving action of the wheels to steer the apparatus.

In testimony whereof I have hereunto set my hand.

EDWIN J. ARMSTRONG.